(12) United States Patent
Bianchini, Jr. et al.

(10) Patent No.: US 6,947,382 B1
(45) Date of Patent: Sep. 20, 2005

(54) PROTECTED UBR

(75) Inventors: Ronald P. Bianchini, Jr., Pittsburgh, PA (US); Joseph C. Kantz, Beaver Falls, PA (US); Jason Bertschi, Bradford Woods, PA (US); Troy DeMaster, Pittsburgh, PA (US)

(73) Assignee: Marconi Intellectual Property (Ringfence), Inc., Warrendale, PA (US)

( * ) Notice: Subject to any disclaimer, the term of this patent is extended or adjusted under 35 U.S.C. 154(b) by 0 days.

(21) Appl. No.: 09/570,672

(22) Filed: May 15, 2000

(51) Int. Cl.$^7$ ............................................. H04L 12/56
(52) U.S. Cl. .............. 370/232; 370/395.21; 370/395.43
(58) Field of Search ................................. 370/229, 230, 370/230.1, 232, 235, 389, 395.1, 395.2, 395.21, 395.4, 395.42, 395.43, 395.6, 412; 709/230, 232, 238, 240

(56) References Cited

U.S. PATENT DOCUMENTS

| | | | | |
|---|---|---|---|---|
| 5,764,641 A | * | 6/1998 | Lin | 370/412 |
| 6,038,217 A | * | 3/2000 | Lyles | 370/233 |
| 6,041,040 A | * | 3/2000 | Beshai et al. | 370/232 |
| 6,064,650 A | * | 5/2000 | Kappler et al. | 370/232 |
| 6,064,651 A | * | 5/2000 | Rogers et al. | 370/233 |
| 6,064,677 A | * | 5/2000 | Kappler et al. | 370/395.43 |
| 6,088,331 A | * | 7/2000 | Beshai et al. | 370/232 |
| 6,377,583 B1 | * | 4/2002 | Lyles et al. | 370/412 |

FOREIGN PATENT DOCUMENTS

| | | | | |
|---|---|---|---|---|
| EP | 0975199 A2 | * | 1/2000 | H04Q/11/04 |
| EP | 0981261 A2 | * | 2/2000 | H04Q/11/04 |

OTHER PUBLICATIONS

Ibe, Oliver C., "Essentials of ATM Networks and Services", 1997, Addison–Wesley, pp. 91–104.*

Newton, Harry, "Newton's Telecom Dictionary", Jan. 1998, Telecom Books and Flatiron Publishing, 13$^{th}$ Edition, p. 722.*

* cited by examiner

*Primary Examiner*—Alpus H. Hsu
(74) *Attorney, Agent, or Firm*—Ansel M. Schwartz

(57) ABSTRACT

A switch for transferring UBR traffic on an ATM network. The switch includes a mechanism for receiving UBR traffic from the network and sending UBR traffic to the network. The switch includes a mechanism for prohibiting a predefined condition in the UBR traffic, the prohibiting mechanism connected to the receiving and sending mechanism. Alternatively, the switch includes a mechanism for receiving UBR traffic in connections from the network and sending UBR traffic in the connections to the network. The switch includes a mechanism for dynamic analysis of the connections of UBR traffic to determine whether the connections have UBR traffic which behaves or which misbehaves. Alternatively, the switch includes a mechanism for receiving UBR traffic in connections from the network and sending UBR traffic in the connections to the network. The switch includes a mechanism for reevaluating connections to determine whether the connections have UBR traffic which behaves or which misbehaves at a predetermined interval. A method for transferring UBR traffic on an ATM network.

24 Claims, 3 Drawing Sheets

PROTECTED UBR

FIELD OF THE INVENTION

The present invention is related to transferring UBR traffic. More specifically, the present invention is related to transferring UBR traffic which is protected from congestion.

BACKGROUND OF THE INVENTION

UBR traffic in an ATM network generally has the lowest status in regard to transference of all types of traffic on an ATM network. Because of its status, it has in the network relative to the other clones of traffic which travel on the ATM network, it has the greatest chance of experiencing congestion. The present invention identifies desired UBR traffic of the UBR traffic and protects it from congestion.

SUMMARY OF THE INVENTION

The present invention pertains to a switch for transferring UBR traffic on an ATM network. The switch comprises a mechanism for receiving UBR traffic from the network and sending UBR traffic to the network. The switch comprises a mechanism for prohibiting a predefined condition in the UBR traffic, the prohibiting mechanism connected to the receiving and sending mechanism.

The present invention pertains to a switch for transferring UBR traffic on an ATM network. The switch comprises a mechanism for receiving UBR traffic in connections from the network and sending UBR traffic in the connections to the network. The switch comprises a mechanism for dynamic analysis of the connections of UBR traffic to determine whether the connections have UBR traffic which behaves or which misbehaves.

The present invention pertains to a switch for transferring UBR traffic on an ATM network. The switch comprises a mechanism for receiving UBR traffic in connections from the network and sending UBR traffic in the connections to the network. The switch comprises a mechanism for reevaluating connections to determine whether the connections have UBR traffic which behaves or which misbehaves at a predetermined interval.

The present invention pertains to a method for transferring UBR traffic on an ATM network. The method comprises the steps of forming connections having UBR traffic with a switch of an ATM network. Then there is the step of receiving UBR traffic on the connections at the switch. Next there is the step of determining whether the connections have misbehaving UBR traffic or behaving UBR traffic. Then there is the step of prohibiting congestion of the UBR traffic by discarding misbehaving UBR traffic received by the switch on connections having misbehaving UBR traffic. Next there is the step of sending behaving UBR traffic to the network.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1A:
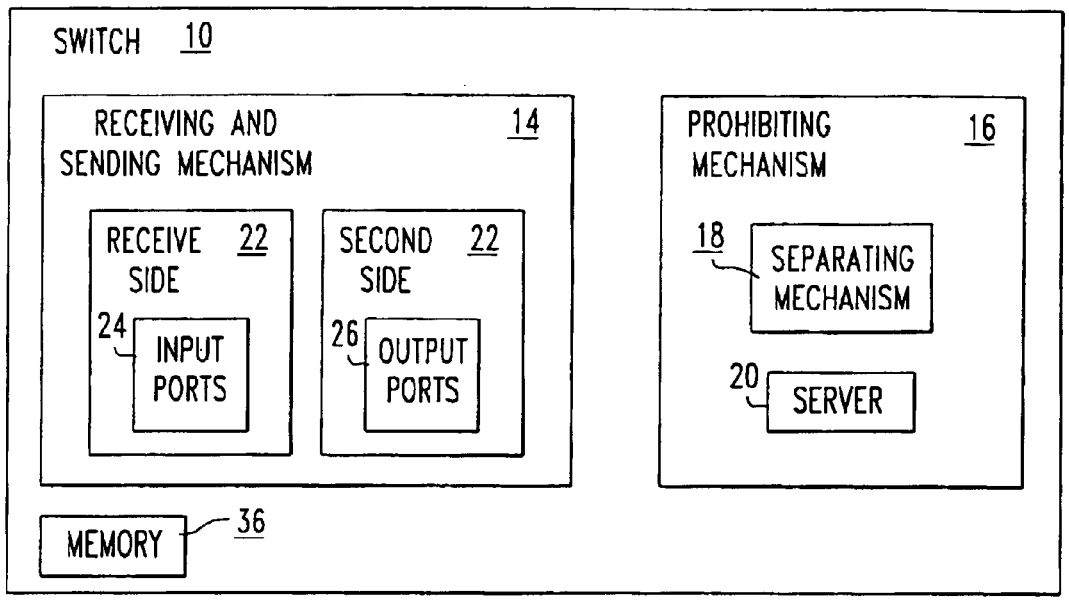
FIG. 1a is a schematic representation of a switch of the present invention.
Figure 1B:
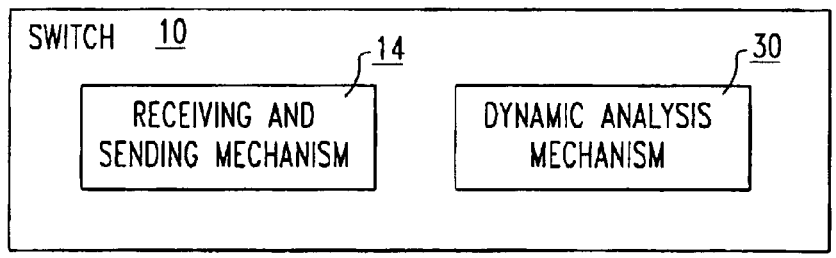
FIG. 1b is a schematic representation of an alternative switch of the present invention.
Figure 1C:
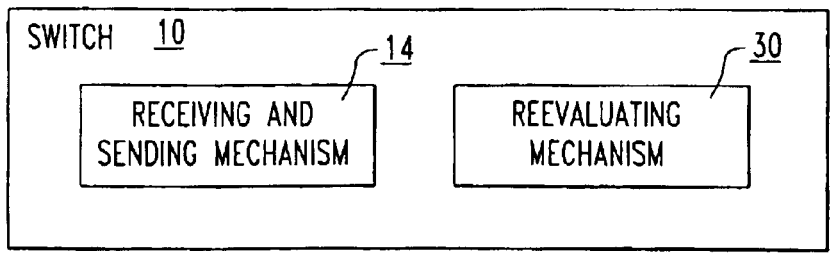
FIG. 1c is a schematic representation of another alternative switch of the present invention.

Referring now to the drawings wherein like reference numerals refer to similar or identical parts throughout the several views, and more specifically to FIG. 1 thereof, there is shown a switch 10 for transferring UBR traffic on an ATM network 12. The switch 10 comprises a mechanism for receiving UBR traffic from the network 12 and sending UBR traffic to the network 12. The switch 10 comprises a mechanism for prohibiting a predefined condition in the UBR traffic, the prohibiting mechanism 16 connected to the receiving and sending mechanism 14.

Preferably, the prohibiting mechanism 16 includes a mechanism 18 for separating the UBR traffic into a first type of UBR traffic and a second type of UBR traffic. The prohibiting mechanism 16 preferably discards the second type of UBR traffic to prohibit the predetermined condition congestion in the UBR traffic. Preferably, the prohibiting mechanism 16 places a tag with the second type UBR traffic.

The prohibiting mechanism 16 preferably discards second type UBR traffic with the tag when a predetermined threshold is exceeded regarding the second type UBR traffic. Preferably, the prohibiting mechanism 16 gives weight to the first type of UBR traffic and second type of UBR traffic which remains after any second type of UBR traffic is discarded, and the prohibiting mechanism 16 includes a server 20. The server 20 provides service to the first type of UBR traffic and second type of UBR traffic according to the weight of the first type of UBR traffic and the second type of UBR traffic.

The prohibiting mechanism 16 preferably performs a dynamic analysis of UBR traffic to determine whether the UBR traffic is first type UBR traffic or second time UBR traffic. Preferably, the UBR traffic is associated with connections and wherein the prohibiting mechanism 16 reevaluates the connections of UBR traffic received by the receiving and sending mechanism 14 at a predetermined interval to determine whether the connections have the second type of UBR traffic or have the first type of UBR traffic. The prohibiting mechanism 16 preferably only reevaluates the connections, which have changed during the interval.

Preferably, the prohibiting mechanism 16 untags any traffic which is tagged that is received by the receiving and sending mechanism 14. The UBR traffic preferably includes cells each of which having a CLP field and wherein the prohibiting mechanism 16 places the tag in the CLP field of each cell of a connection of the second type of UBR traffic. Preferably, the predetermined condition is congestion and connections having the first type of UBR traffic are guaranteed service by the server 20. The first type of UBR traffic preferably is behaved UBR traffic and the second type of UBR traffic is misbehaved UBR traffic.

Preferably, the dynamic analysis occurs according to $$AllocatedBWVC_x = \frac{W_x}{\sum_i W_i} \times <PortLineRate>$$

where $W_1$ is estimated bandwidth for $i^{th}$ connection and $W_x$ is a weighted sum of all bandwidth over all connections. The receiving and sending mechanism 14 preferably includes a receive side 22 having input ports 24 for receiving UBR traffic from the ATM network 12,. and a second side 25 having output ports 26 for sending packets to the ATM network 12.

The present invention pertains to a switch 10 for transferring UBR traffic on an ATM network 12. The switch 10 comprises a mechanism for receiving UBR traffic in connections from the network 12 and sending UBR traffic in the connections to the network 12. The switch 10 comprises a mechanism 28 for dynamic analysis of the connections of UBR traffic to determine whether the connections have UBR traffic which behaves or which misbehaves.

The present invention pertains to a switch 10 for transferring UBR traffic on an ATM network 12. The switch 10 comprises a mechanism for receiving UBR traffic in connections from the network 12 and sending UBR traffic in the connections to the network 12. The switch 10 comprises a mechanism 30 for reevaluating connections to determine whether the connections have UBR traffic which behaves or which misbehaves at a predetermined interval.

The present invention pertains to a method for transferring UBR traffic on an ATM network 12. The method comprises the steps of forming connections having UBR traffic with a switch 10 of an ATM network 12. Then there is the step of receiving UBR traffic on the connections at the switch 10. Next there is the step of determining whether the connections have misbehaving UBR traffic or behaving UBR traffic. Then there is the step of prohibiting congestion of the UBR traffic by discarding misbehaving UBR traffic received by the switch 10 on connections having misbehaving UBR traffic. Next there is the step of sending behaving UBR traffic to the network 12.

Preferably, the prohibiting step includes the step of placing a tag with traffic of connections having misbehaving UBR traffic. The discarding step preferably includes the step of discarding tagged misbehaving UBR traffic when a predetermined threshold is exceeded regarding the misbehaving UBR traffic. Preferably, the prohibiting step includes the steps of giving weight to behaving UBR traffic connections and misbehaving UBR traffic which remain after any misbehaving UBR traffic is discarded, and providing service with a server 20 to the behaving UBR connections and the misbehaving UBR traffic according to the weight of the connections.

The prohibiting step preferably includes the step of performing dynamic analysis on the UBR traffic of the connections to determine whether the UBR traffic of the connections is behaving UBR traffic or misbehaving UBR traffic. Preferably, the prohibiting step includes the step of reevaluating the connections of UBR traffic received at the switch 10 at a predetermined interval to determine whether the connections have behaving UBR traffic or misbehaving UBR traffic. The reevaluating step preferably includes the step of reevaluating only the connections, which have changed in the interval.

Preferably, after the receiving step, there is the step of untagging any UBR traffic which is tagged that is received by the switch 10. The tagging step preferably includes the step of placing a tag in the CLP field of each cell of a connection having UBR traffic which misbehaves.

In the operation of the preferred embodiment, the present invention identifies a new traffic class, Protected UBR, that will be supported in the ASX- 4000 product of Fore Systems, Inc., Warrendale, Pa. Protected UBR is similar to UBR in that it identifies best-effort traffic scheduling in the switch 10. Protected UBR differs from UBR only during periods of sustained overload. Under Protected UBR, each "well-behaved" UBR VC is protected from other UBR VCs that may not be "well-behaved". A protected UBR VC is guaranteed switch 10 resources up to a defined "well-behavior" limit. Above that limit, resources are allocated fairly among all VCs. By guaranteeing switch 10 resources, a protected UBR VCs performance can be predicted during sustained overload periods.

UBR and Protected UBR perform identically until traffic is offered to the switch 10 that overloads a single output port for a sustained period of time such that a queue memory 36 is filled and a cell must be dropped. UBR and Protected UBR differ only in the identification of the which cells to drop once a queue memory 36 is filled. UBR drops cells fairly based on the offered load of the switch 10 and Protected UBR drops cells fairly based on a defined output limit.

Figure 2:
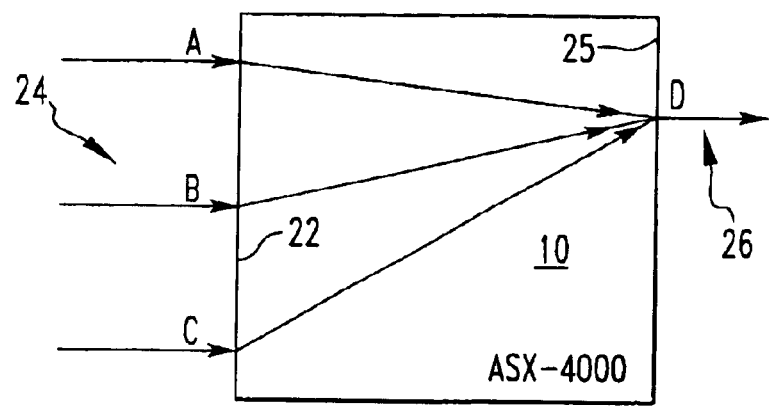
FIG. 2 is a schematic representation of another switch having 3 input ports and an output port.

As an example, and referring to FIG. 2, consider three UBR VCs (A, B and C) that arrive as input to an ASX- 4000 on three separate OC-12 ports and are transmitted on output port D:

|   | offered load | UBR | Protected UBR |
|---|---|---|---|
| A | 0.33 | 0.20 | 0.33 |
| B | 0.33 | 0.20 | 0.33 |
| C | 1.00 | 0.60 | 0.33 |

Under standard UBR, all three VCs are treated fairly. They receive equal access to the output scheduler 34 and queue memory 36 locations. During a sustained overload period, the egress scheduler 34 memory 36 becomes full and cells are dropped. Cells are dropped at the admission process to the cell memory 36. Cells are admitted fairly based on their arrival rate to the egress scheduler 34. Consider an offered load of 0.33, 0.33 and 1.0 of OC-12 line rate for VCs A, B and C, respectively. Once memory 36 is filled, all arriving cells are treated fairly and are admitted based on their arrival rate. Cells from VC C are admitted at three times the rate of cells from VCs A and B. Due to the admission process, the output rates of the VCs are 0.2, 0.2 and 0.6, respectively, which maintains the three to one fairness based on the VC arrival rates.

Under Protected UBR, VCs A and B are "protected" from VC C which is causing the overload of output port D. If VCs A, B and C are to be treated equally, they are each allocated ⅓rd of the output BW of port D. The admission policy at the egress scheduler 34 is modified to admit cells based on the intended output rate of the VCs. Under Protected UBR, the output rates of VCs A, B and C are 0.33, 0.33 and 0.33. The exact calculation for the allocation of the output BW and how Protected UBR is implemented in the ASX- 4000 is given below.

Configuring Protected UBR occurs in the following way.

Figure 3:
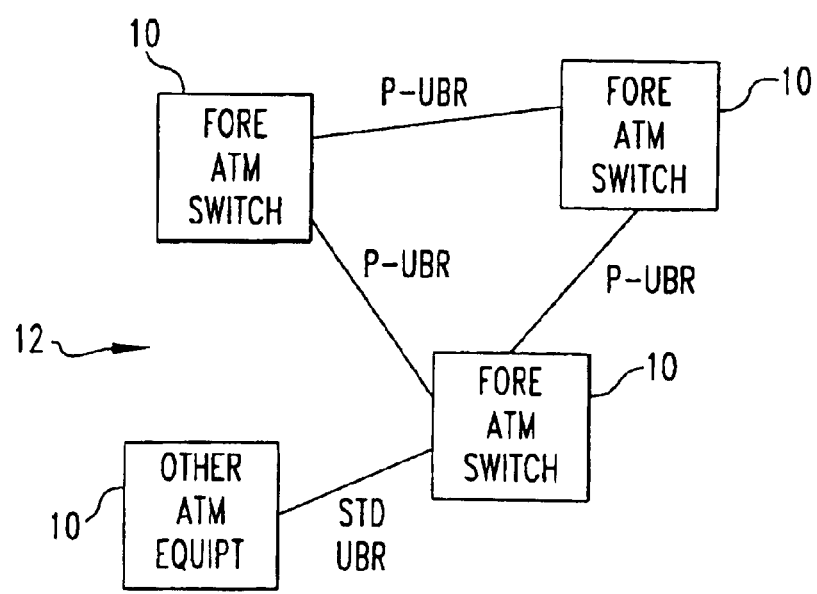
FIG. 3 is a schematic representation of a network.

Protected UBR is not signaled and must be configured at each switch 10. To aid in flexibility at the switch 10, Protected UBR is configured on a port-by-port basis. Each link in the network 12 is identified as either a "UBR-link", or a "Protected UBR-link" as shown in FIG. 3. To facilitate the link mode, the switch 10 ports at both connections of the link are programmed as either UBR mode (by default), or Protected UBR mode.

Since ports can be configured individually, a switch 10 can support both UBR and Protected UBR links simultaneously.

To implement Protected UBR, the desired output bandwidth for each VC on a Protected UBR output port must be calculated. Each VC is allocated a fraction of the output bandwidth of the output port and is then guaranteed enough switch 10 resources to guarantee that it can always achieve that bandwidth. The fraction of the output bandwidth that is allocated to a Protected UBR VC is calculated using the estimated bandwidth, $W_i$, assigned to the VC in the load balanced weighted UBR constraint-based routing protocol. The bandwidth allocated to a particular VC, $VC_x$, is the weighted sum of all of $VC_x$ over all of the VCs, $VC_i$, on the output port:

$$AllocatedBWVC_x = \frac{W_x}{\sum_i W_i} \times <PortLineRate>$$

where $W_i$ is estimated bandwidth for $i^{th}$ connection and $W_x$ is a weighted sum of all bandwidths over all connections.

If no estimated value is given for a particulate VC, a programmable default value is used. In the example presented above, if VCs A, B and C all have weight 100, then they are each allocated ⅓rd of the output port bandwidth.

In the ASC-4000 switch 10, there are two resources that must be allocated to implement Protected UBR: the fabric 32 and the output scheduler 34. The fabric 32 receives all cells that are received at input ports 24 of the switch 10. The fabric 32 input stage can always accept cells provided that its memory 36 is not full. Once the memory 36 is full, the cell admission process is based on the CLP bits first, and then based fairly on the cell arrival rate. For queuing purposes, the output scheduler 34 operates in a similar fashion to the fabric 32. All cells that arrive at the output scheduler 34 are queued in memory 36 and scheduled for output provided that its memory 36 is not full. Once full, the admission process is first based on the CLP bits of the cells, and then based fairly on the cell arrival rate.

Fore UBR VCs, all cells have CLP=0 and the fabrics and output schedulers treat all cells fairly for queue admission, based on their arrival rate. Protected UBR is implemented in the ASX-4000 using the CLP bit in each cell to alter the admission process at the fabric 32 and output scheduler 34. For each output port that is implementing Protected UBR the desired output rate for each VC on the port is calculated using the equation given above. The input port policer for each VC is programmed to clear any arriving CLP=1 bit to CLP=0 and then set the CLP=1 bit for any cell that arrives above the desired output rate threshold. The fabric 32 is programmed to admit all cells (CLP=1 and CLP=0) until it approaches saturation. Once the fabric memory 36 is near full, only CLP=0 cells are admitted and it approaches saturation. Once the fabric memory 36 is near full, only CLP=0 cells are admitted and CLP=1 cells are dropped. The egress scheduler 34 admission policy is programmed in a similar fashion. All cells are admitted until the memory 36 approaches saturation. Once saturated, only CLP=0 cells are accepted for admission. Finally, the egress scheduler 34 is programmed to transmit the UBR VCs in a weighted round-robin fashion, based on the weights calculated above.

During non-oversubscribed operation, all queues are not full and both CLP=0 and CLP=1 cells are accepted and transmitted. During a sustained oversubscription period, a queue memory 36 becomes full and only CLP=0 cells are accepted. Furthermore, all CLP=0 cells must be accepted, since the weights in the policers are calculated such that all CLP=0 cells are at (or below) line rate for each output port. Thus, during oversubscription the VC throughputs in the switch 10 default to the rate of the CLP=0 cells for each VC. This operation yields the desired results: all cells (CLP=0 and CLP=1) are queued and transmitted during non-oversubscribed periods, and VCs are guaranteed at least their desired resources (CLP=0 cells) during sustained oversubscribed periods.

Figure 4:
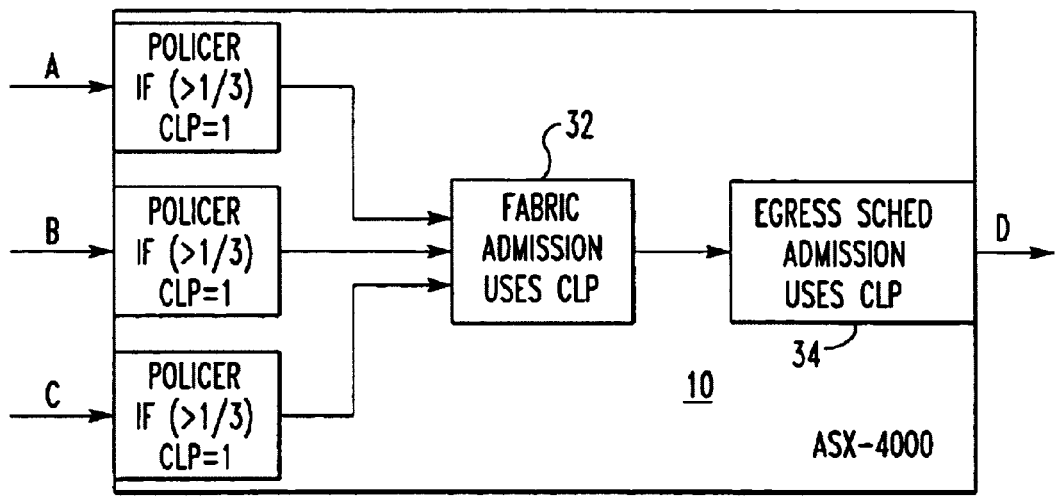
FIG. 4 is a schematic representation of another switch having 3 input ports and an output port.

In the previous example, as shown in FIG. 4, VC inputs A, B and C have equal UBR-w weights of 100 and are calculated to each run at ⅓rd of line rate of port D during over-subscription. The input stage policers admit CLP=0 cells up to ⅓rd the line rate of port D. All other cells that arrive above ⅓rd the line rate of port D are marked CLP=1. Since all CLP=0 cells are admitted at each stage, each input VC is guaranteed to achieve at least its output rate of ⅓rd the line rate of port D.

In regard to performance guarantees, by using the CLP bits throughput the switch 10, Protected UBR VCs operate correctly across all port types, including OC-3, OC-12 and OC-48. The following two guarantees can be made about VCs that are transmitted on a Protected UBR link.

G1. The output bandwidth of any Protected UBR VC ($VC_x$) is guaranteed to be at least equal to its calculated output bandwidth of $BW\text{-}VC_x \geq W_x/\Sigma W_i$.

Since all CLP=0 cells are guaranteed to be accepted at both the fabric 32 and egress scheduler 34, each Protected UBR VC will achieve at least its calculated output rate. If one of the VCs on the output port is transmitting below its rate, the remaining bandwidth is allocated fairly (based on the cell arrival rate) to the other VCs.

G2. The cell transit delay of any Protected UBR VC that is transmitting below its calculated output bandwidth is guaranteed to be well bounded.

A low delay bound can be derived from the operation of the egress scheduler 34. To implement Protected UBR, the egress scheduler 34 is programmed to use weighted round-robin for the transmitted cells. The weights for the scheduler 34 are the same as those used to calculate the policer CLP=0 rate. Each VC is guaranteed to have its output cells scheduled at its desired rate if cells are available. Furthermore, the scheduled output rate could exceed that rate if other VCs do not have cells to transmit. Thus, for well-behaved VCs the transmission rate is scheduled at greater than or equal to the input arrival rate at the egress scheduler 34. The delay imposed by the scheduler 34 approaches zero, since the queue will empty.

Figure 5:
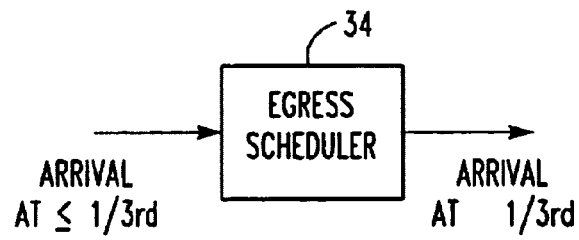
FIG. 5 is a schematic representation of an egress scheduler.

Using the example three VCs given above, for well behaved VCs (A and B), the egress scheduler 34 receives cells at ≤⅓rd of the line rate of port D, as shown in FIG. 5. Since all three VCs are equally weighted, they are guaranteed to get ≥⅓rd of the output line rate. The queue depth for VCs A and B will remain close to zero in the egress scheduler 34.

ASX-4000 side effects using Protected UBR VC. The following side effects are apparent when implementing Protected UBR on the ASX-4000.

1. Due to the usage of the estimated bandwidth parameters for load balanced UBR that is provided in ForeThought PNNI of Fore Systems, Inc., Warrendale, Pa., incorporated by reference herein, Protected UBR requires the use of ForeThought PNNI with SPVCs and the load balanced UBR option enabled.

2. For any output port that is implementing Protected UBR, both CLP=0 and CLP=1 cells are transmitted. The ASX-4000 can clear and set the CLP bits in the policer at the input stage of the switch 10. To let the CLP bits be visible at subsequent stages of the switch 10 (fabric 32 and egress scheduler 34), they must also be transmitted on the output port. This does not affect transmission of the cells. Subsequent ASX-4000s that receive the cells, first clear the incoming CLP bits and then recalculate the CLP bits based on its output port weights. The CLP bits are also not expected to affect other ATM equipment, since both CLP=0 and CLP=1 cells are always received and transmitted normally. Due to CLP transmission, Protected UBR can be enabled on a per-port basis. In case of future problems with CLP=1 cells, Protected UBR can be disabled on any port that this might cause trouble.

3. The accuracy of Protected UBR is a function of the accuracy of the input stage policer. The policer can be inaccurate at up to 3% at OC-12 rates.

4. To maintain call set-up rates, the policer and egress scheduler 34 rates are calculated as a periodic background task. When a new Protected UBR VC is added or deleted, the standard UBR call setup procedure is invoked and a flag is set to indicate that the weights need to be recalculated. Periodically, the flags are examined and the weights are recalculated. A side effect of this implementation is that weights can be inaccurate for a brief period of time following call setup. The switch 10 operates correctly, except that the guaranteed output rates will be slightly incorrect for a brief period of time. The background task period is programmable and is expected to operate at roughly once per second.

5. For Protected UBR to operate correctly at the fabric 32 level, Protected UBR must be enabled on all ports that are serviced by that fabric 32.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A switch for transferring UBR traffic on an ATM network comprising:

a mechanism for receiving UBR traffic from the network and sending UBR traffic to the network; and a mechanism for prohibiting a predefined condition in the UBR traffic, the prohibiting mechanism includes a mechanism for separating the UBR traffic into a first type of protected UBR traffic and a second type of unprotected UBR traffic, the prohibiting mechanism discards the second type of UBR traffic to prohibit the predetermined condition in the UBR traffic when a predetermining threshold is exceeded regarding the second type of UBR traffic, the prohibiting mechanism connected to the receiving and sending mechanism.

2. A switch as described in claim 1 wherein the prohibiting places a tag with the second type UBR traffic.

3. A switch as described in claim 2 wherein the prohibiting mechanism discards second type UBR traffic with the tag when the predetermined threshold is exceeded regarding the second type UBR traffic.

4. A switch as described in claim 3 wherein the prohibiting mechanism gives weight to the first type of UBR traffic and second type of UBR traffic which remains after any second type of UBR traffic is discarded, and the prohibiting mechanism includes a server, the server providing service to the first type of UBR traffic and second type of UBR traffic according to the weight of the first type of UBR traffic and the second type of UBR traffic.

5. A switch as described in claim 4 wherein the prohibiting mechanism performs a dynamic analysis of UBR traffic to determine whether the UBR traffic is first type UBR traffic or second type UBR traffic.

6. A switch as described in claim 5 wherein the UBR traffic is associated with connections and wherein the prohibiting mechanism reevaluates the connections of UBR traffic received by the receiving and sending mechanism at a predetermined interval to determine whether the connections have the second type of UBR traffic or have the first type of UBR traffic.

7. A switch as described in claim 6 wherein the prohibiting mechanism only reevaluates the connections, which have changed during the interval.

8. A switch as described in claim 7 wherein the prohibiting mechanism untags any traffic which is tagged that is received by the receiving and sending mechanism.

9. A switch as described in claim 8 wherein the UBR traffic includes cells each of which having a CLP field and wherein the prohibiting mechanism places the tag in the CLP field of each cell of a connection of the second type of UBR traffic.

10. A switch as described in claim 9 wherein the predetermined condition is congestion and connections having the first type of UBR traffic are guaranteed service by the server.

11. A switch as described in claim 10 wherein the first type of UBR traffic is behaved UBR traffic and the second type of UBR traffic is misbehaved UBR traffic.

12. A switch as described in claim 11 wherein the dynamic analysis occurs according to $$AllocatedBWVC_x = \frac{W_x}{\sum_i W_i} \times <PortLineRate>$$

where $W_i$ is estimated bandwidth for $i^{th}$ connection and $W_x$ is a weighted sum of all bandwidth over all connections.

13. A switch as described in claim 12 wherein the receiving and sending mechanism includes a receive side having input ports for receiving UBR traffic from the ATM network, and a second side having output ports for sending packets to the ATM network.

14. A switch for transferring UBR traffic on an ATM network comprising:

a mechanism for receiving protected UBR traffic and unprotected UBR traffic in connections from the network and sending, the protected and unprotected UBR traffic in the connections to the network when a predetermined threshold is not exceeded and sending only the protected UBR traffic to the network when the predetermined threshold is exceeded; and a mechanism for dynamic analysis of the connections of the protected and unprotected UBR traffic to determine whether the connections have protected UBR traffic which behaves or unprotected UBR traffic which misbehaves.

15. A switch for transferring UBR traffic on an ATM network comprising:

a mechanism for receiving protected UBR traffic and unprotected UBR traffic in connections from the network and sending UBR traffic in the connections to the network when a predetermined threshold is not exceeded and sending only the protected UBR traffic to the network when the predetermined threshold is exceeded; and a mechanism for reevaluating connections to determine whether the connections have the protected UBR traffic which behaves or the unprotected UBR traffic which misbehaves at a predetermined interval.

16. A method for transferring UBR traffic on an ATM network comprising the steps of:

forming connections having protected UBR traffic and unprotected UBR traffic with a switch of an ATM network;

receiving the protected and unprotected UBR traffic on the connections at the switch;

determining whether the connections have the unprotected UBR traffic which is misbehaving or protected UBR traffic which is behaving;

prohibiting congestion of the UBR traffic by discarding the unprotected UBR traffic which is misbehaving received by the switch on connections having the unprotected UBR traffic which is misbehaving; and sending behaving UBR traffic to the network.

17. A method as described in claim 16 wherein the prohibiting step includes a step of placing a tag with traffic of connections having misbehaving UBR traffic.

18. A method as described in claim 17 wherein the discarding step includes a step of discarding tagged misbehaving UBR traffic when a predetermined threshold is exceeded regarding the misbehaving UBR traffic.

19. A method described in claim 18 wherein the prohibiting step includes a step of giving weight to behaving UBR traffic connections and misbehaving UBR traffic which remain after any misbehaving UBR traffic is discarded, and providing service with a server to the behaving UBR connections and the misbehaving UBR traffic according to the weight of the connections.

20. A method as described in claim 19 wherein the prohibiting step includes a step of performing dynamic analysis on the UBR traffic of the connections to determine whether the UBR traffic of the connections is behaving UBR traffic or misbehaving UBR traffic.

21. A method as described in claim 20 wherein the prohibiting step includes a step of reevaluating the connections of UBR traffic received at the switch at a predetermined interval to determine whether the connections have behaving UBR traffic or misbehaving UBR traffic.

22. A method as described in claim 21 wherein the reevaluating step includes a step of reevaluating only the connections, which have changed in the interval.

23. A method as described in claim 22 wherein after the receiving step, there is a step of untagging any UBR traffic which is tagged that is received by the switch.

24. A method as described in claim 23 wherein the tagging step includes a step of placing a tag in the CLP field of each cell of a connection having UBR traffic which misbehaves.

* * * * *

UNITED STATES PATENT AND TRADEMARK OFFICE
CERTIFICATE OF CORRECTION

PATENT NO. : 6,947,382 B1
APPLICATION NO. : 09/570672
DATED : September 20, 2005
INVENTOR(S) : Bianchini, Jr. et al.

It is certified that error appears in the above-identified patent and that said Letters Patent is hereby corrected as shown below:

In Column 3, Line 7, delete "$W_1$" and insert -- $W_i$ --, therefor.

In Column 7, Line 61, in Claim 2, insert -- mechanism --, before "places".

Signed and Sealed this

Fourth Day of November, 2008

JON W. DUDAS
*Director of the United States Patent and Trademark Office*